United States Patent

Young et al.

[15] 3,646,323

[45] Feb. 29, 1972

[54] MAGNETIC CARD READER-RECORDER

[72] Inventors: Virgil F. Young, 1123 Elsah Ave., North Whittier, Calif. 90601; Amable A. Pebenito, 6861 West 85th Pl., Los Angeles, Calif. 90045

[22] Filed: July 2, 1970

[21] Appl. No.: 60,956

Related U.S. Application Data

[62] Division of Ser. No. 790,632, Jan. 13, 1969.

[52] U.S. Cl. ....................235/61.11 D
[51] Int. Cl. ....................G06k 7/08
[58] Field of Search..............235/61.11 R, 61.11 D, 61.11 A, 235/61.11 B; 271/44 A, 32, 18 A

[56] References Cited

UNITED STATES PATENTS 2,335,277 11/1943 Heller..................179/100.2
3,109,924 11/1963 Frederick..................235/61.11 D

*Primary Examiner*—Daryl W. Cook
*Attorney*—Fred N. Schwend

[57] ABSTRACT

A combined reader and recorder for both magnetic tape and magnetic cards wherein the tape and cards may be advanced in either direction during reading or recording. The apparatus comprises two spaced feed rollers extending across a card guideway and driven in either of opposite directions. Pinch rollers for holding the cards against respective feed rollers extend over one portion only of the guideway and other pinch rollers are carried by a magnetic tape magazine for guiding the tape along another portion of the rollers. A pressure pad for maintaining the cards in intimate contact with the transducer head is movable out of the way when the magnetic tape magazine is to be placed in position to process the tape.

2 Claims, 10 Drawing Figures

INVENTORS.
VIRGIL F. YOUNG
AMABLE A. PEBENITO

BY. [signature]
ATTORNEY.

INVENTORS.
VIRGIL F. YOUNG
AMABLE A. PEBENITO

BY. [signature]
ATTORNEY.

INVENTORS.
VIRGIL F. YOUNG
AMABLE A. PEBENITO
BY. [signature]
ATTORNEY.

MAGNETIC CARD READER-RECORDER

This is a division of application Ser. No. 790,632, filed on Jan. 13, 1969.

This invention relates to magnetic record reading and recording equipment such as is used to transmit data to and from a computer or other data source or storage. A principle object of the invention is to facilitate the feeding of magnetic tape or magnetic cards in either direction through a read-record apparatus.

The manner in which the above and other objects of the invention are accomplished will be readily understood upon reference to the following specification when read in conjunction with the accompanying drawings, wherein.

Figure 1:
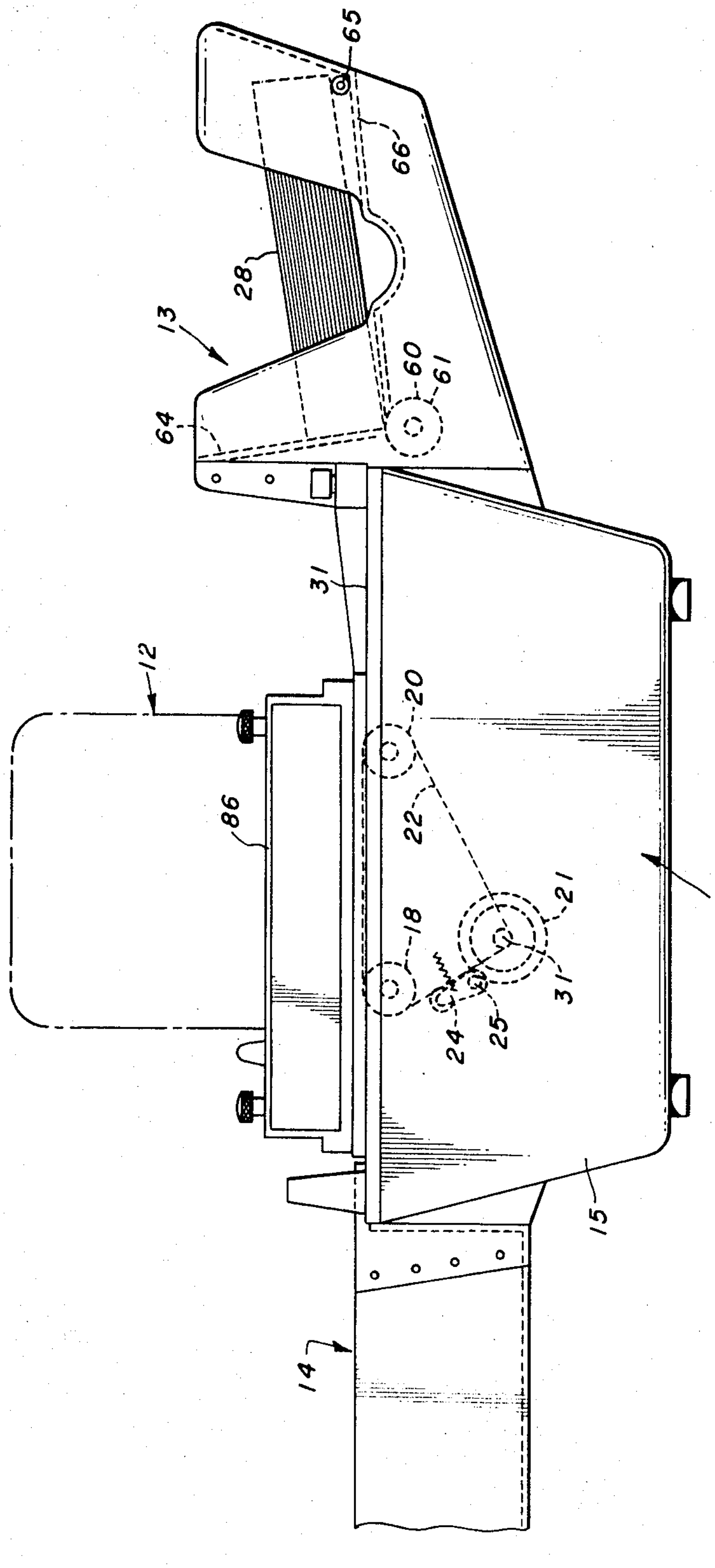
FIG. 1 is a front view of a magnetic tape and card processor embodying a preferred form of the present invention.

Referring particularly to FIG. 1, the processor comprises generally a transport and transducing unit 11, a magnetic tape magazine or cartridge 12, a card supply hopper 13, and a card stacker 14.

Figure 7:
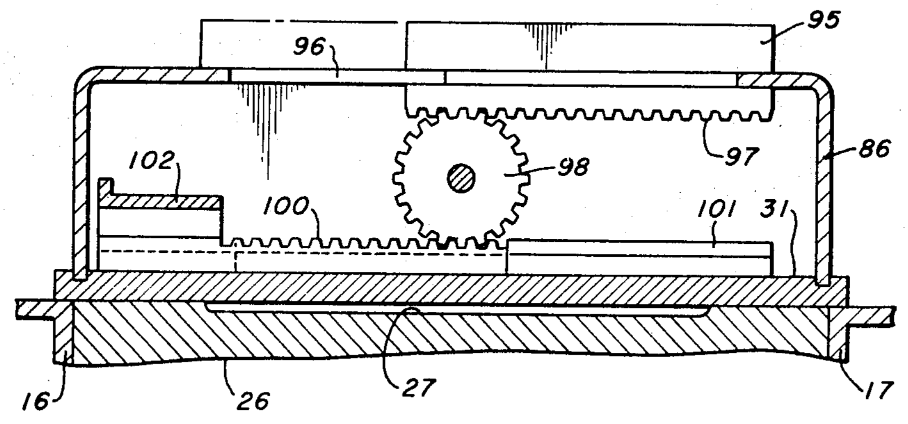
FIG. 7 is a transverse sectional view taken along line 7—7 of FIG. 6.

The unit 11 comprises a base 15 including spaced depending walls 16 and 17 (FIGS. 7 and 8) which have bearings thereon for rotatably supporting a pair of spaced drive rollers 18 and 20. The rollers are driven by a reversible stepper motor 21 which may be of conventional construction, through a flexible thin endless belt 22 preferably made of metal and having a thickness on the order of 0.003 to 0.005 inches. The belt is wrapped around a motor pulley 23 and is held in intimate contact with the rollers and pulley by a spring tensioned arm 24 fulcrummed at 25.

Figure 2:
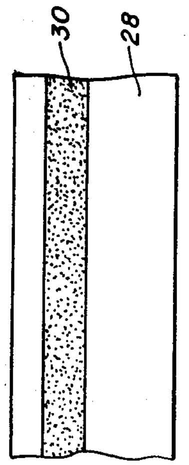
FIG. 2 is a face view of a magnetically coated card adapted to be processed by the processor.

A base plate 26 is suitably mounted between the walls 16 and 17 and has a guideway 27 formed therein to receive and guide cards 28 (FIG. 2) therealong, each card having a strip 30 of magnetic oxide or a similar magnetic tape section bonded thereto.

A top plate 31 is suitably secured to the plate 26 to complete the card guideway and to support various elements of the processor, as will be described later.

Figure 4:
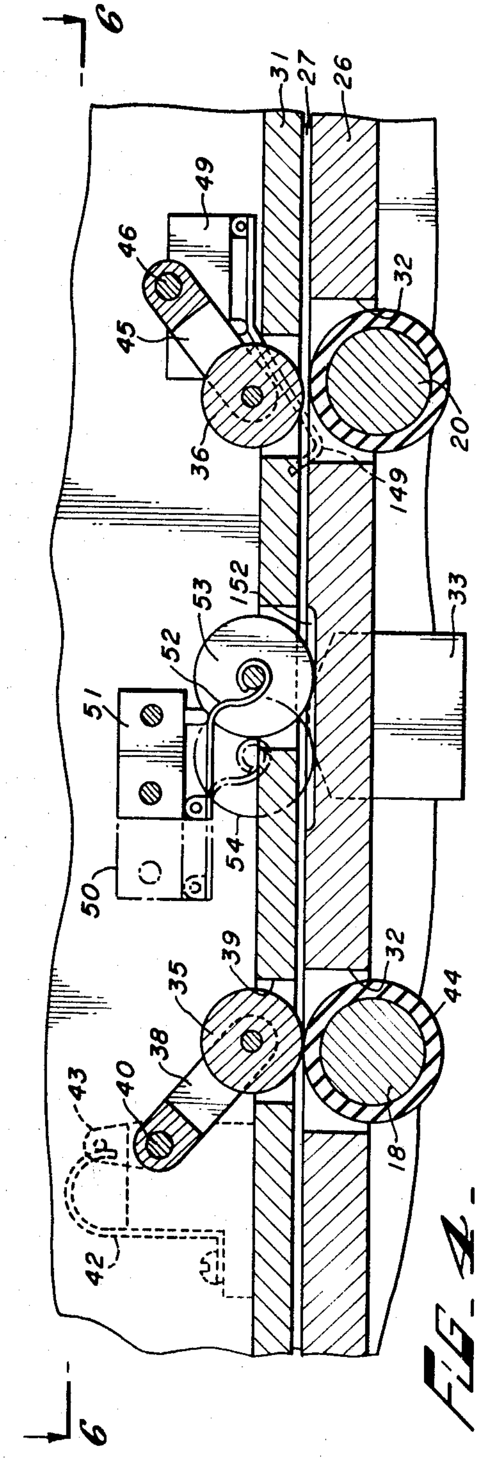
FIG. 4 is a sectional view taken substantially along lines 4—4 of FIG. 3.

As seen in FIG. 4, the plate 26 has openings 32 therein in which the rollers 18 and 20 project, the upper peripheries of the rollers extending tangentially with the bottom surface of the card guideway 27.

A magnetic read-write head extends into an elongate opening 34 (FIGS. 5 and 6) formed in the plate 26 coextensive with the openings 32. The opening 34 is aligned with an opening 37 in the plate 31. The upper surface 29 forming part of the magnetic pole sections of the head 33 also preferably extends coincident with the plane of the bottom surface of guideway 27.

Pinch rollers 35 and 36 are provided to cooperate with rollers 18 and 20, respectively, to effect feeding of cards serially through the processor in either direction. The pinch roller 35 extends into an opening 39 in plate 31 and is carried by a U-shaped arm 38 (FIGS. 4 and 6) secured on a rock shaft 40 rockably mounted in a pivot bracket 41 secured to the top plate 31. A wire spring 42 engages an arm 43 secured on shaft 40 to continually press the pinch roller 35 downwardly into contact with a rubber sleeve 44 bonded on the roller 18.

Figure 9:
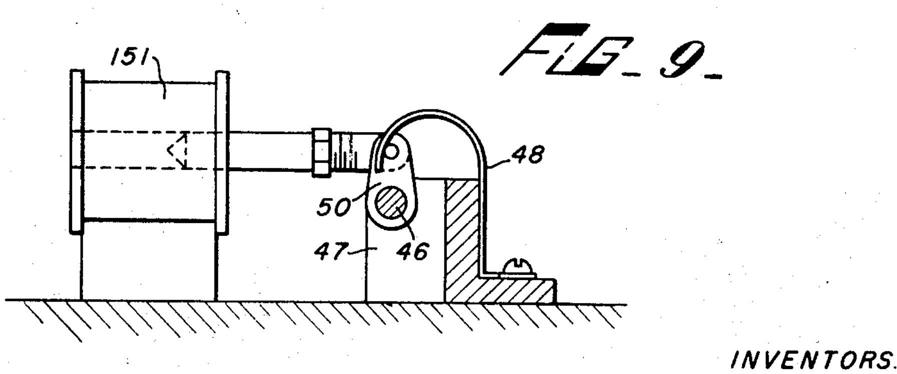
FIG. 9 is a sectional view taken along line 9—9 of FIG. 6.

The pinch roller 36 is similarly supported by an arm 45 secured on shaft 46 pivotally mounted in a bracket 47 (see also FIG. 9). However, the pinch roller 36 is normally held out of engagement with roller 20 by a wire spring 48 which engages an arm 150 secured to the shaft 46 and pivotally connected to the armature of a solenoid 151 suitably mounted on the plate 31.

Figure 6:
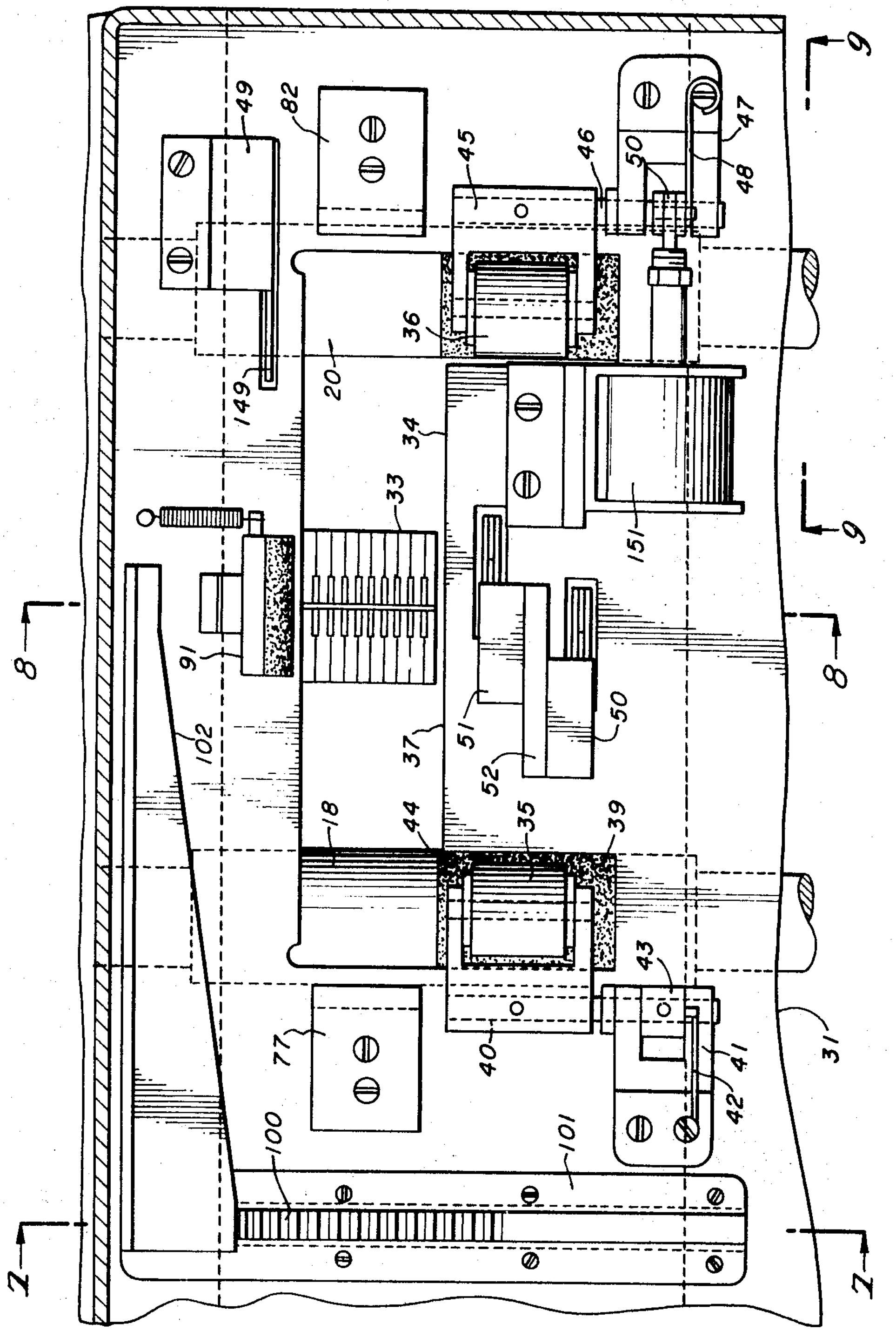
FIG. 6 is a sectional plan view taken along line 6—6 of FIG. 4.
Figure 8:
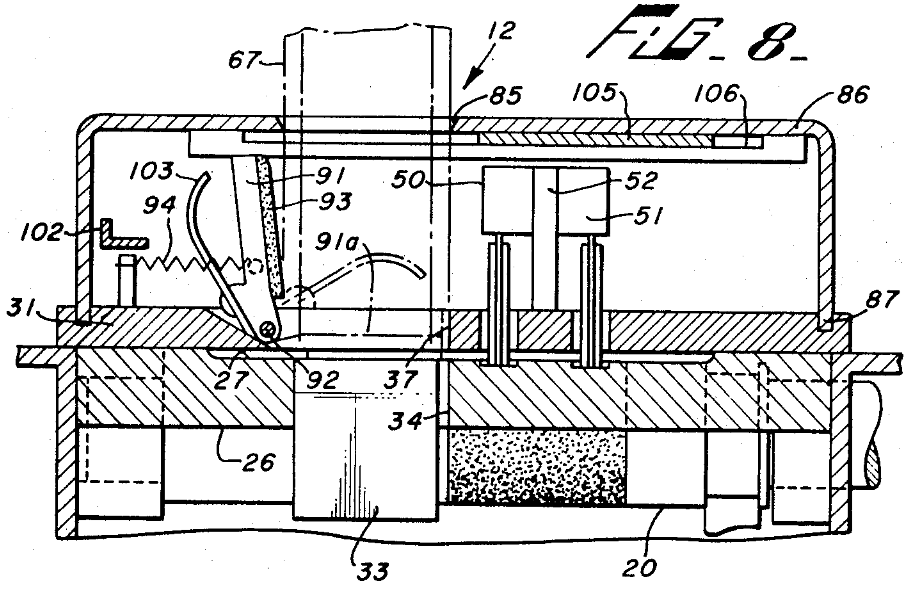
FIG. 8 is a transverse sectional view taken along line 8—8 of FIG. 6.

It will be noted in FIG. 6 that the pinch rollers 35 and 36 and cooperating rubber sleeves, i.e., 44, forming part of the rollers 18 and 20, extend across only a portion of the card guideway 27 and are located in the right half portion of such guideway (as viewed in FIG. 8).

A normally closed "card position" switch 50 (FIGS. 4, 8 and 10) and a normally closed "end-of-record" switch 51 are mounted on opposite sides of an upstanding wall section 52, in line with the pinch rollers 35 and 36. Switch 51 has an actuating arm 52 carrying a card actuated roller 53 located slightly to the right of the center of the transducer head 33 (as seen in FIG. 4) and extending into a depression 152 in the guideway 27. Switch 50 likewise has an actuating arm carrying a card actuated roller located slightly to the left of the center of head 33. Also, a normally closed "pinch roller" switch 49 is mounted above the guideway and has an actuating arm 149 extending into the guideway 27 in the path of cards 28.

Figure 3:
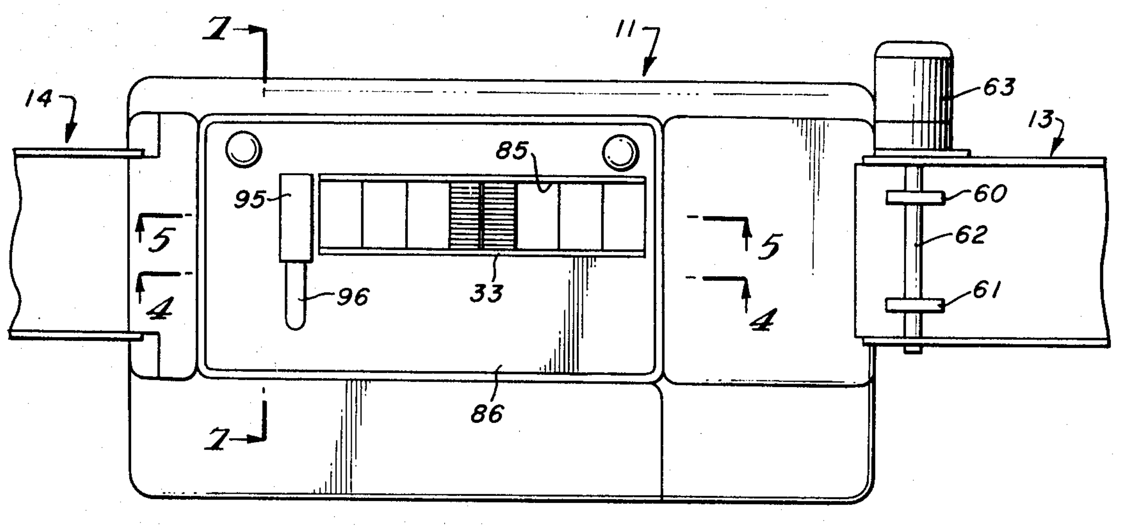
FIG. 3 is a plan view of the processor.

Describing now the card hopper 13 (FIGS. 1 and 3), the latter is adapted to support a deck of "magnetic" cards 28, the lower card of which rests of a pair of axially spaced feed rollers 60 and 61. The latter are carried by a shaft 62 of a feed motor 63 which is mounted on one side of the hopper. The upper parts of the peripheries of the rollers 60 and 61 are substantially in the plane of the bottom surface of the card guideway 27 and a wall member 64 extends downwardly to a point adjacent the peripheries of the rollers to permit only one card at a time to be advanced into the guideway 27. The cards are held inclined, as seen in FIG. 1, by a roller 65 so that the entire deck tends to rest against the wall member 64.

When the card feed motor 63 is energized and the lowermost card 28 in the deck is advanced slightly into the guideway 27 by the rollers 60 and 61, it will drop off the roller 65 onto a bottom wall 66 of the hopper, thus freeing such card from an undue frictional engagement with the card directly thereabove.

Figure 5:
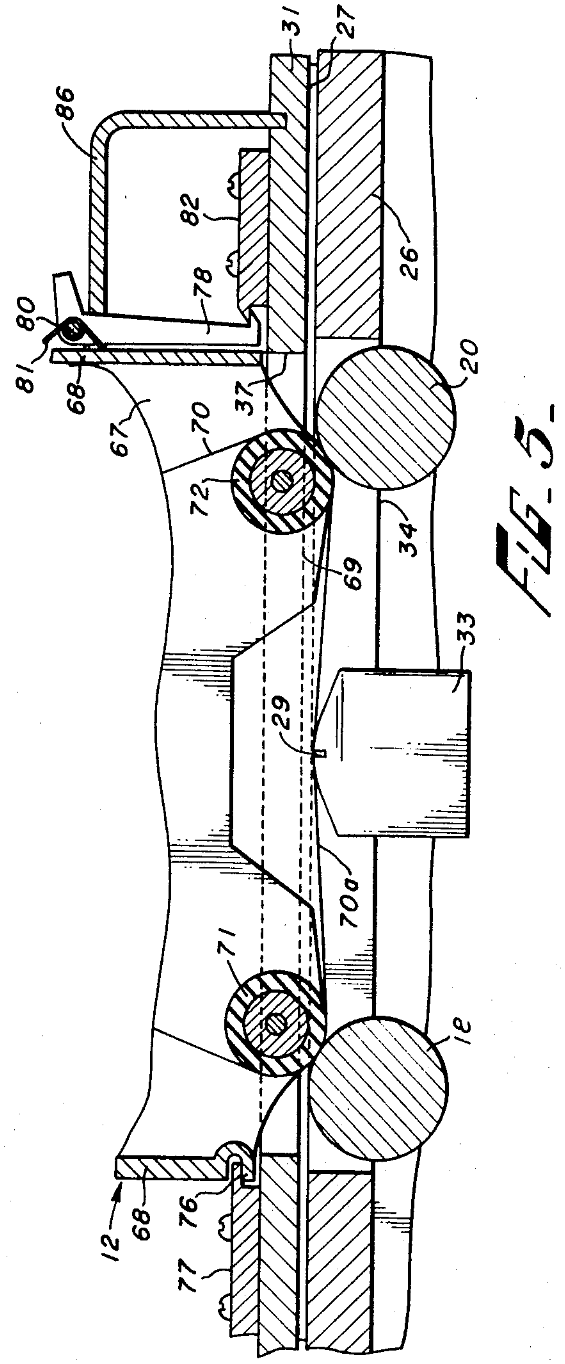
FIG. 5 is a sectional view taken substantially along the line 5—5 of FIG. 3, illustrating a magnetic tape magazine mounted on the processor.

The magnetic tape cartridge 12 (FIGS. 1, 5 and 8) has side and end walls 67 and 68, respectively, surrounding the same except for an opening 69 in the bottom edge thereof. Also, the sidewalls 67 extend below the level of the end walls 68, as best seen in FIG. 5. Means (not shown) are provided for supporting an endless magnetic tape 70 in the cartridge. The tape is guided under two spaced rubber covered rolls 71 and 72 rotatably mounted between the sidewalls thereof.

When it is desired to read or record data on magnetic tape in lieu of the cards 28, the tape cartridge is fitted through an opening 85 in a cover member 86 which is removably mounted in a channel 87 in the top plate 31 and is mounted in position over the opening 37 to locate the tape 70 in line with the left-hand section of the card guideway 27 (as viewed in FIG. 8). When so mounted, the lower portions of the sidewalls 67 fit snugly within the opening 37 and thus laterally locate the cartridge.

It will be noted in FIG. 5 that the rolls 71 and 72 are spaced apart a distance less than the spacing between the feed rollers 18 and 20 so that the points of contact between coacting one of the rolls and rollers will be lower than the plane of the guideway 27. Accordingly, when the cartridge is in position, the strand 70*a* of tape extending between the rolls 71 and 72 is wrapped slightly over the upper surface of the head 33. In such condition, a small downward component of force is applied to the portion of the tape midway between the rolls so as to maintain intimate contact between the tape and the head.

Means are provided for locking the cartridge in position. For this purpose, a ledge 76 is formed along the bottom edge of the cartridge at one end to fit in a notch formed by a retainer piece 77 secured to the top plate 31. A latch or pawl

78 is pivoted at 80 to the opposite end wall of the cartridge and is yieldably rocked outward by a spring 81 to engage a second retainer piece 82 secured to the top plate. By rocking the latch 78 slightly clockwise, the cartridge may be removed.

When it is desired to read or record the cards 28, the tape cartridge 12 is removed and the cards to be processed are placed in the hopper 13. For the purpose of maintaining the cards in intimate contact with head 33 during passage thereover, a pressure pad 91 (FIGS. 6 and 8) is provided. The latter is pivoted at 92 on the top plate 31 and carries a soft resilient pad 93 effective when the pad 91 is swung downwardly into its alternate position shown by the dotted lines 91*a* in the opening 37 to lightly engage the upper surface of each card passing over the head 33. A tension spring 94 normally holds the pad in its raised position to permit the tape cartridge 12 to be mounted in place.

Means are provided for rocking the pressure pad 91 downward into operative position and for this purpose a manually movable slide 95 (FIG. 7) is slideable along a slot 96 in the top cover 86 and carries a rack gear 97 meshing with a pinion 98 rotatably mounted on the inside of the cover. The pinion 98 meshes with a gear rack 100 slideable in ways 101 carried by the top plate 31. The rack gear 100 carries a camming arm 102 which, when the slide 95 is moved to the left in FIG. 7, engages a cam 103 on the pressure pad 91 and thus rocks the same clockwise against the action of spring 94 into operative position.

Also attached to the slide 95 is a cover plate 105 (FIG. 8) which is slideable laterally in guideways 106 and adapted to completely cover the opening 85 in cover 86 to prevent entrances of dirt and/or dust onto the head 33 and other parts of the unit when the slide is moved to return the pressure pad from its operative position.

Figure 10:
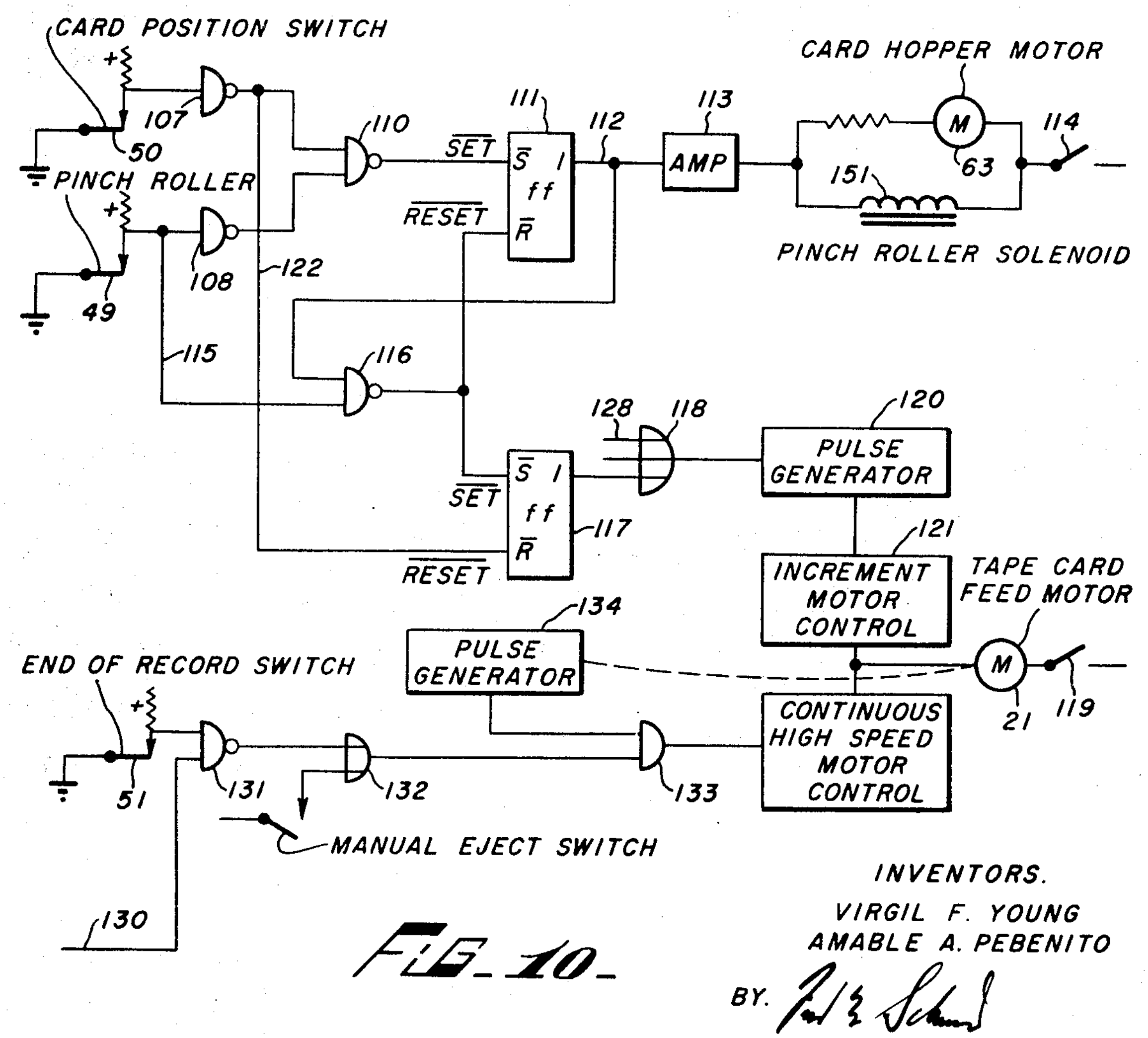
FIG. 10 is a diagram illustrating the basic control circuitry of the processor.

Describing now the control circuitry shown in FIG. 10 for controlling the stepper motor 21 and the hopper motor 63, it will be recalled that the switches 49, 50 and 51 are closed when no card 28 is in the guideway 27. Defining the circuitry in terms of high and low potential conditions wherein ground is considered a low potential, it will be seen that the switches 49 and 50 are connected to the inputs of respective inverters 107 and 108, the outputs of which are connected to respective inputs of a "NAND"-gate 110 whose output is connected to the $\overline{S}$ terminal of a flip-flop 111. Thus, the flip-flop is normally set to apply a high potential over line 112 to amplifier 113, the output of which is connected in parallel to the solenoid 151 and the hopper motor 63. Upon closing switches 114 and 119 preparatory to a card reading or recording operation, the motor 63 and solenoid 151 will be energized to feed the lowermost card 28 in the hopper through the guideway 27. As the leading edge of the card 28 engages the switch actuating arm 149, it opens switch 49. Therefore, a high potential will be applied over line 115 to one input of a "NAND"-gate 116 and since the line 112 is still high at this time, the output of gate 116 will change to low, thus resetting flip-flop 111 and setting a second flip-flop 117. When so set, the flip-flop 117 will transmit a signal through an "OR"-gate 118 to cause operation of a relatively slow frequency oscillator or pulse generator 120 to feed stepping pulses through a motor control circuit 121 to the card feed motor 21. Therefore, the card will be advanced through the guideway 27 at a rate of speed depending upon the frequency of the pulse generator 120. Just prior to reaching the head 33, the leading edge of the card will open the "end-of-record" switch 51 and just after passing the head, the card will open switch 50, causing a low potential signal to be applied over line 122 to reset flip-flop 117, thus stopping the motor 21. The card is now in condition to read or record data thereon.

As data in the form of combinations of electric pulses are recorded onto or read from the magnetic strip on the card, a corresponding pulse for each digit is applied over line 128 to a second input of the "OR"-gate 118, causing the pulse generator 120 to step the motor 21 a predetermined amount for each digit. Other controls, not shown, may be provided to control the motor circuit 121 to reverse the direction of advancement of the motor 21, and therefore the card, at certain times.

As the trailing edge of a card 28 approaches the head 33, it passes from under the roller 53 of switch 51, allowing the same to close to apply a low potential to one input of a "-NAND"-gate 131. At such time, or shortly after, a low potential signal may be applied signifying the end of a message, which signal is applied to a second input of gate 131 over line 130. The output of gate 131 is connected through an "OR"-gate 132 to one input of an "AND"-gate 133. Also applied to the "AND"-gate 133 are pulses from a relatively high-frequency pulse generator 134 which is driven by the motor 21 to cause the motor to eject the card 28 into the stacker 14 at a relatively high rate of speed.

When data is recorded on or read from the magnetic tape, the switches 49, 50 and 51 are allowed to remain closed. Pulses accompanying data pulses are applied to line 128 in the same manner as when cards are used, causing incremental advancement of the motor 21.

I claim:

1. A magnetic card transducer apparatus comprising a magnetic transducer head,
   - a structure forming a guideway for guiding a card past said head,
   - a feed roller for feeding said card along said guideway,
   - a stepper motor for incrementally rotating said roller,
   - means comprising a relatively low-frequency pulse generator for applying stepping pulses to said stepping motor;
   - means comprising a relatively high-frequency pulse generator for applying stepping pulses to said stepping motor;
   - a first switching device controlled by said card during movement thereof along said guideway for rendering said low-frequency pulse generator effective and said high-frequency pulse generator ineffective, and
   - a second switching device controlled by said card during further movement of said card along said guideway for rendering said high-frequency pulse generator effective and said low-frequency pulse generator ineffective.

2. A magnetic card transducer apparatus according to claim 1 wherein said second switching device is located between said first mentioned switching device and said head.

* * * * *

UNITED STATES PATENT OFFICE
CERTIFICATE OF CORRECTION

Patent No. 3,646,323 Dated February 29, 1972

Inventor(s) Virgil F. Young, et al

It is certified that error appears in the above-identified patent and that said Letters Patent are hereby corrected as shown below:

On the cover sheet, insert -- [73] Assignee Clary Datacomp Systems, Inc., San Gabriel, Calif., a Corp. of Delaware. -- .

Signed and sealed this 14th day of November 1972.

(SEAL)
Attest:

EDWARD M.FLETCHER,JR.
Attesting Officer

ROBERT GOTTSCHALK
Commissioner of Patents